US008457305B2

(12) United States Patent
Lauter et al.

(10) Patent No.: US 8,457,305 B2
(45) Date of Patent: Jun. 4, 2013

(54) GENERATING GENUS 2 CURVES FROM INVARIANTS

(75) Inventors: Kristin Lauter, Redmond, WA (US); Tonghai Yang, Madison, WI (US)

(73) Assignee: Microsoft Corporation, Redmond, WA (US)

( * ) Notice: Subject to any disclaimer, the term of this patent is extended or adjusted under 35 U.S.C. 154(b) by 439 days.

(21) Appl. No.: 12/618,346

(22) Filed: Nov. 13, 2009

(65) Prior Publication Data

US 2011/0116623 A1     May 19, 2011

(51) Int. Cl.
*H04K 1/00* (2006.01)
*H04L 9/00* (2006.01)
*H04L 9/32* (2006.01)
*G06F 12/14* (2006.01)

(52) U.S. Cl.
USPC .......... 380/28; 380/30; 380/44; 713/176; 713/180; 713/189

(58) Field of Classification Search
USPC ........... 380/28, 30, 44; 713/176, 180, 189
See application file for complete search history.

(56) References Cited

U.S. PATENT DOCUMENTS

| 7,885,406 | B2 * | 2/2011 | Lauter et al. ............ 380/44 |
| 2006/0120528 | A1 | 6/2006 | Weng |
| 2007/0053506 | A1 | 3/2007 | Takashima |
| 2007/0192397 | A1 | 8/2007 | Lauter et al. |
| 2007/0291937 | A1 | 12/2007 | Katagi et al. |
| 2008/0095357 | A1 | 4/2008 | Kitamura et al. |
| 2009/0290705 | A1 * | 11/2009 | Lauter et al. ............ 380/30 |
| 2010/0172491 | A1 * | 7/2010 | Broker et al. ............ 380/28 |

OTHER PUBLICATIONS

"Hyperelliptic Curve", Retrieved at <<http://en.wikipedia.org/wiki/Hyperelliptic_curve>>, Aug. 5, 2009, pp. 2.
"Gallery of Jacobians", Retrieved at <<http://www-math.mit.edu/~drew/ZetaFunctions.html>>, Aug. 5, 2009, pp. 2.
"Montgomery Scalar Multiplication for Genus 2 Curves", Retrieved at <<http://d.wanfangdata.com.cn/NSTLHY_NSTL_HY753079.aspx>>, Aug. 5, 2009, p. 1.
Bruinier, et al., "CM-Values of Hilbert Modular Functions", Retrieved at <<http://www.mrlonline.org/mcom/1999-68-225/S0025-5718-99-01020-0/S0025-5718-99-01020-0.pdf>>, Feb. 2006, vol. 163, No. 2, pp. 1-53.
Naganuma, Hidehisa, "On the Coincidence of Two Dirichlet Series Associated with Cusp Forms of Hecke's "Neben"-Type and Hilbert Modular Forms over a Real Quadratic Field", Retrieved at <<http://projecteuclid.org/DPubS/Repository/1.0/Disseminate?view=body&id=pdf_1&handle=euclid.jmsj/1240435455>>, 1973, vol. 25, No. 4, pp. 547-555.
Wamelen, Paul Van, "Examples of Genus Two CM Curves Defined Over the Rationals" Retrieved at <<http://www.mrlonline.org/mcom/1999-68-225/S0025-5718-99-01020-0/S0025-5718-99-01020-0.pdf>>, Jan. 1999, vol. 68, No. 225, pp. 307-320.

(Continued)

*Primary Examiner* — Mohammad W Reza
(74) *Attorney, Agent, or Firm* — Microsoft Corporation

(57) ABSTRACT

One or more techniques and/or systems are disclosed for generating a genus 2 curve for use in cryptography. One or more invariant values used to generate the genus 2 curve are determined by evaluating one or more invariant functions on a Hilbert modular surface. The genus 2 curve is generated using the one or more invariant values to determine an equation describing the genus 2 curve. A group is generated from the genus 2 curve, and the group may be used for a cryptographic application.

20 Claims, 9 Drawing Sheets

OTHER PUBLICATIONS

Eisentrager, et al., "A CRT Algorithm for Constructing Genus 2 Curves over Finite Fields", 2000 <<http://research.microsoft.com/en-us/um/people/klauter/EisentraegerLauter.pdf>>, pp. 1-16.

McGuire, Gary, "Genus 2 Curves of p-Rank 1 via CM Method", Apr. 2009 at <<http://iml.univ-mrs.fr/ati/GeoCrypt2009/slides/G.McGuire.pdf>>, pp. 28.

"On the Functional Equation of Certain Dirichlet Series", Koji Doi and Hidehisa Naganuma, Inventiones Math, vol. 9, 1969, 14 pgs.

"Hilbert Modular Surfaces", Gerard Van Der Geer, A Series of Modern Surveys in Mathematics, vol. 16, 1988, Abstract only, 1 pg.

"Lectures on Hilbert Modular Varieties and Modular Forms", Eyal Z. Goren, a Co-Publication of the American Mathematical Society and Centre de Recherches Mathematiques, vol. 14, 2002, Abstract only, 2 pgs.

The determination of n Funktione for Hilbert modular group of Zahlkorpers Q(V5), K.-B. Gundlach, Math Annalen, 152, 1963, submitting both German language, 31 pgs. And English language, 31 pgs.

"Intersection Numbers of Curves on Hilbert Modular Surfaces and Modular Forms of Nebentypus", F. Hirzebruch and D. Zagier, Inventiones Math, vol. 36, 1976, 57 pgs.

"Effective Methods in Algebraic Geometry", MORA, Progress in Mathematics, vol. 94, May, 1991, reprinted from the Internet at: http://www.powells.com/biblio?isbn=9780817635466, Book News Annotation only, 2 pgs.

On the Graded Ring of Hilbert Modular Forms Associated with Q(p5), H.L. Resnikoff, Math. Ann. 208, 1974, 10 pgs.

"Modular Forms Associated to Real Quadratic Fields", Don Zagier, Inventiones Math, vol. 30, 1975, pp. 1-46.

"Arithmetic Variety of Moduli for Genus Two", Annals of Mathematics, Jun-Ichi Igusa, Second Series, vol. 72, No. 3, Nov., 1960, pp. 612-649, 3 pgs.

"On Siegel Modular Forms of Genus Two", Jun-Ichi Igusa, American Journal of Mathematics, vol. 84, No. 1 Jan., 1962, pp. 175-200, 3 pgs.

"Modular Forms and Projective Invariants", Jun-Ichi Igusa, American Journal of Mathematics, vol. 89, No. 3 Jul. 1067, pp. 817-855, 6 pgs.

* cited by examiner

GENERATING GENUS 2 CURVES FROM INVARIANTS

BACKGROUND

Computers have become increasingly interconnected via networks (such as the Internet), and security and authentication concerns have become increasingly important. Cryptographic techniques that involve a key-based cipher, for example, can take sequences of intelligible data (e.g., typically referred to as plaintext) that form a message and mathematically transform them into seemingly unintelligible data (e.g., typically referred to as ciphertext), through and enciphering process. In this example, the enciphering can be reversed, thereby allowing recipients of the ciphertext with an appropriate key to transform the ciphertext back to plaintext, while making it very difficult, if not nearly impossible, for those without the appropriate key from recovering the plaintext.

Public-key cryptographic techniques are an embodiment of key-based cipher. In public-key cryptography, for example, respective communicating parties have a public/private key pair. The public key of the respective pairs is made publicly available (e.g., or at least available to others who are intended to send encrypted communications), and the private key is kept secret. In order to communicate a plaintext message using encryption to a receiving party, for example, an originating party can encrypt the plaintext message into a ciphertext message using the public key of the receiving party and communicate the ciphertext message to the receiving party. In this example, upon receipt of the ciphertext message, the receiving party can decrypt the message using its secret private key, thereby recovering the original plaintext message.

An example of public/private key cryptology comprises generating two large prime numbers and multiplying them together to get a large composite number, which is made public. In this example, if the primes are properly chosen and large enough, it may be extremely difficult (e.g., practically impossible due to computational infeasibility) for someone who does not know the primes to determine them from just knowing the composite number. However, in order to be secure, the size of the composite number should be more than 1,000 bits. In some situations, such a large size makes impractical to be used.

An example of authentication is where a party or a machine attempts to prove that it is authorized to access or use a product or service. Often, a product ID system is utilized for a software program(s), where a user enters a product ID sequence stamped on the outside of the properly licensed software package as proof that the software has been properly paid for. If the product ID sequence is too long, then it will be cumbersome and user unfriendly. Other common examples include user authentication, when a user identifies themselves to a computer system using an authentication code.

As another example, in cryptography, elliptic curves are often used to generate cryptographic keys. An elliptic curve is a mathematical object that has a structure and properties well suited for cryptography. Many protocols for elliptic curves have already been standardized for use in cryptography. Further, genus 2 curves can be used with cryptography; however, unlike the case of elliptic curves (which are genus 1 curves), protocols for these genus 2 curves have not been standardized.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Encryption and decryption are usually performed based on a secret. This secret is often an order of a group of points. A variety of different curves can be used, and in one implementation the curve is a genus 2 curve. A group of elements (e.g., points) derived from a genus 2 curve can be used in the encryption/decryption, for example, as a discrete logarithm problem (DLP) for such a group is considered to be hard or difficult to solve. A hard DLP is preferred in cryptology in order to create a more secure encryption/decryption process, for example.

Currently, when constructing a genus 2 curve for cryptographic purposes three auxiliary polynomials with rational coefficients are typically computed. These polynomials are usually Igusa class polynomials, and the roots are often referred to as "invariants," where three Igusa invariants can be used to construct a genus 2 curve, for example. Presently, computation of Igusa class polynomials is very difficult and computationally expensive.

One or more of the techniques and/or systems described herein provide an alternate to using three Igusa invariants for generating a genus 2 curve. Using these techniques and/or systems one may merely utilize two invariants to generate a genus 2 curve, for example, where the invariants are not Igusa invariants. In this way, for example, a genus two curve may be generated in a faster time, using less computing resources, as there are fewer invariants that are simpler to evaluate.

In one embodiment, when generating a genus 2 curve for use in cryptography, one or more invariant values, which may be used to generate the genus 2 curve, are determined by evaluating one or more invariant functions on a Hilbert modular surface. For example, polynomials generated by the invariant functions evaluated on the Hilbert modular surface may be used as the invariant values for determining the curve. The genus 2 curve can then be generated using the one or more invariant values, for example, by using the invariant values (e.g., polynomials) in an algorithm to recover an equation that describes the curve. After the genus 2 curve is created, a group, such as a set of elements, can be generated from the curve where the group is used for a cryptographic application.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
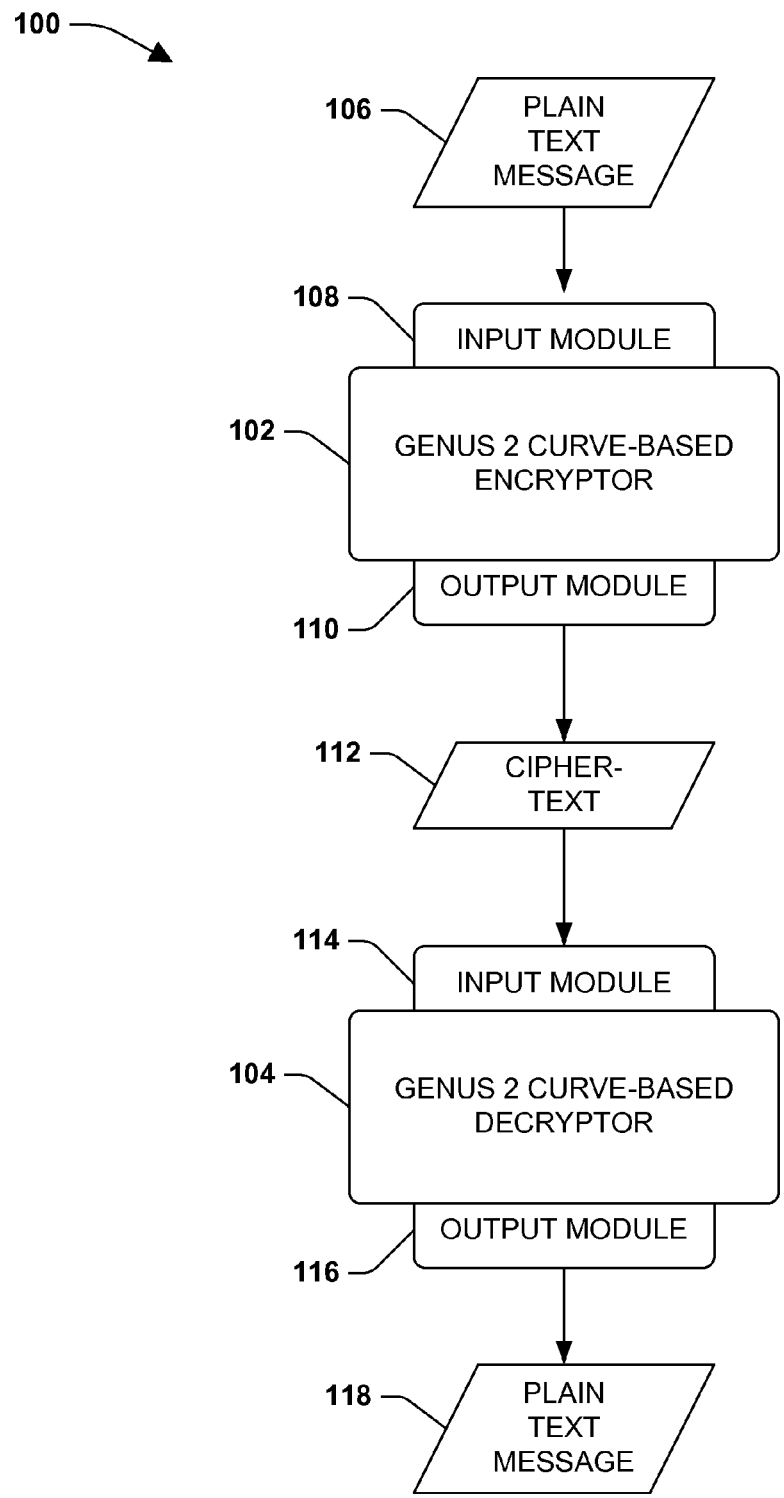
FIG. 1 is a block diagram illustrating an exemplary cryptosystem in accordance with one or more of the provisions set forth herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

One or more of the cryptographic curve generation techniques and/or systems described herein can create a genus 2 curve that can be used for cryptographic applications, such as to create a cryptographic key.

Figure 2:
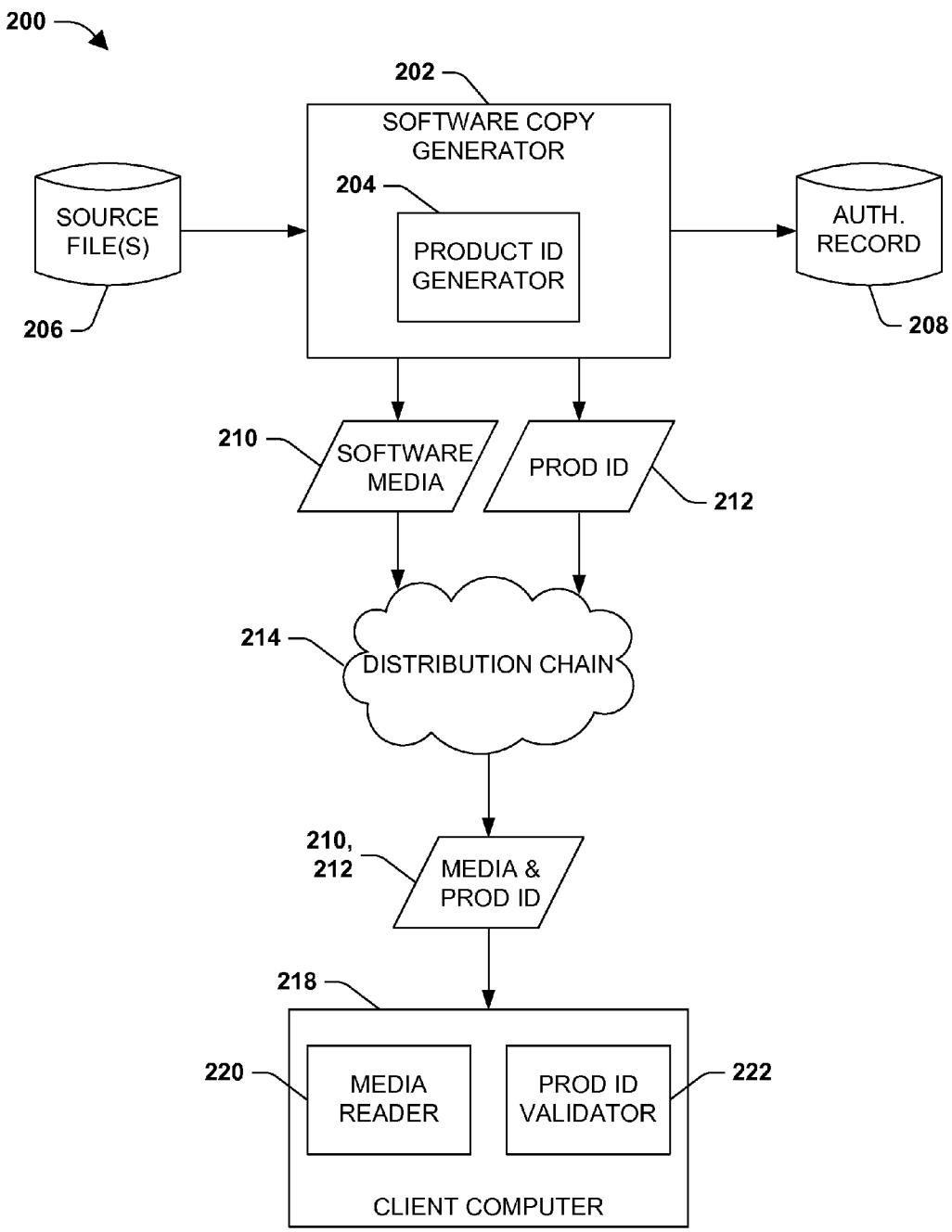
FIG. 2 is an illustration of an exemplary system using a product identifier to validate software in accordance with one or more of the provisions set forth herein.

Typically, a curve-based cryptosystem utilizes a group (e.g., of elements and a binary multiplier) whose size is known to a cryptosystem designer, but is typically unknown and believed difficult to determine for potential malicious attackers of the cryptosystem. The curve-based encryption and decryption illustrated in FIG. 1, as an example, typically refers to encryption and decryption that uses keys that are generated based on aspects or characteristics of an algebraic curve. The exemplary cryptosystems of FIGS. 1 and 2 are a function of the type of curve and a secret group size generated from the curve. In one embodiment of cryptographic curve generation, the curve may be a Jacobian of a genus 2 curve, and the secret group size can be the size of the group of points on the Jacobian of the genus 2 curve.

Curve-based cryptosystems can be used to encrypt a wide variety of information. For example, a cryptosystem may be used to generate a "short" signature or product identifier, which is a code that allows validation and/or authentication of a machine, program or user, for example. The signature can be a "short" signature in that it uses a relatively small number of characters.

FIG. 1 is a block diagram illustrating an exemplary cryptosystem 100 in accordance with certain embodiments disclosed herein. The exemplary cryptosystem 100 comprises an encryptor 102 and a decryptor 104. A plaintext message 106 can be received at an input module 108 of the encryptor 102, which is a genus 2 curve-based encryptor that encrypts message 106 based on a public key generated based on a secret group size (known only by decryptor 104). In one embodiment, the secret group size can be a size of a group of points generated from the genus 2 curve used by the encryptor 102, and discussed in more detail below. A plaintext message 106 is typically an unencrypted message, although encryptor 102 can encrypt other types of messages. Thus, the message 106 may alternatively be encrypted or encoded by some other component (not shown) or a user.

An output module 110 of the encryptor 102 outputs an encrypted version of the plaintext message 106, which can be ciphertext 112. Ciphertext 112, which may comprise a string of unintelligible text or some other data, can then be communicated to the decryptor 104, which can be implemented, for example, on a computer system remote from a computer system on which encryptor 102 is implemented. Given the encrypted nature of ciphertext 112, the communication link between the encryptor 102 and the decryptor 104 need not be secure (e.g., it is often presumed that the communication link is not secure). As an example, the communication link can be one of a wide variety of public and/or private networks implemented using one or more of a wide variety of conventional public and/or proprietary protocols, and including both wired and wireless implementations. Additionally, the communication link may include other non-computer network components, such as hand-delivery of media including ciphertext or other components of a product distribution chain.

The decryptor 104 receives the ciphertext 112 at an input module 114 and, because the decryptor 104 is aware of the secret group size used to encrypt the message 106 (e.g., as well as the necessary generator), can decrypt the ciphertext 112 to recover the original plaintext message 106, which is output by an output module 116 as a plaintext message 118. In one embodiment, the decryptor 104 is a genus 2 curve-based decryptor that decrypts the message based on the size of the group of points generated from the genus 2 curve (e.g., a same value as was used by encryptor 102), and is discussed in more detail below.

In one embodiment, the encryption and decryption are performed in the exemplary cryptosystem 100 based on a secret, which may be the size of the group of points generated from the genus 2 curve. The secret is a shared secret, as it is known to the decryptor 104, and a public key can be generated based on the secret known to encryptor 102. In this embodiment, this knowledge may allow the encryptor 102 to encrypt a plaintext message that can be subsequently decrypted merely by the decryptor 104. Other components, including the encryptor 102, which do not have knowledge of the secret, cannot decrypt the ciphertext (e.g., although decryption may be technically possible, it is not computationally feasible). Similarly, in one embodiment, the decryptor 104 may also generate a message using the secret based on a plaintext message; a process referred to as digitally signing the plaintext message. In this embodiment, the signed message can be communicated to other components, such as the encryptor 102, which can verify the digital signature based on the public key.

FIG. 2 is an illustration of an exemplary system 200 using a product identifier to validate software in accordance with certain embodiments of the methods and systems described herein. The exemplary system comprises a software copy generator 202 including a product identifier (ID) generator 204. Software copy generator 202 that may produce software media 210 (e.g., a CD-ROM, DVD (Digital Versatile Disk), etc.) that can contain files needed to collectively implement a complete copy of one or more application programs, (e.g., a word processing program, a spreadsheet program, an operating system, a suite of programs, and so forth). These files can be received from source files 206, which may be a local source (e.g., a hard drive internal to generator 202), a remote source (e.g., coupled to generator 202 via a network), or a combination thereof. Although a single generator 202 is illustrated in FIG. 2, often multiple generators operate individually and/or cooperatively to increase a rate at which software media 210 can be generated.

A product ID generator 204 can generate a product ID 212 that may include numbers, letters, and/or other symbols. The generator 204 generates a product ID 212 using the genus 2 curve-based encryption techniques and/or systems described herein. The product ID 212 may be printed on a label and affixed to either a carrier containing software media 210 or a box into which software media 210 is placed. Alternatively, the product ID 212 may be made available electronically, such as a certificate provided to a user when receiving a softcopy of the application program via an on-line source (e.g., downloading of the software via the Internet). The product ID 212 can serve multiple functions, such as being cryptographically validated to verify that the product ID is a valid product ID (e.g., thus allowing the application program to be installed). As a further example, the product ID 212 may serve to authenticate the particular software media 210 to which it is associated.

The generated software media 210 and associated product ID 212 can be provided to a distribution chain 214. The distribution chain 214 can represent one or more of a variety of conventional distribution systems and methods, including possibly one or more "middlemen" (e.g., wholesalers, suppliers, distributors, retail stores (either on-line or brick and mortar), etc.), and/or electronic distribution, such as over the Internet. Regardless of the manner in which media 210 and the associated product ID 212 are distributed, the media 210 and product ID 212 are typically purchased by (e.g., licensed) or distributed to, the user of a client computer 218, for example.

The client computer 218 can include a media reader 220 that is capable of reading the software media 210 and installing an application program onto client computer 218 (e.g., installing the application program on to a hard disk drive or memory (not shown) of client computer 218). In one embodiment, part of the installation process can involve entering the product ID 212 (e.g., to validate a licensed copy). This entry may be a manual entry (e.g., the user typing in the product ID via a keyboard), or alternatively an automatic entry (e.g., computer 218 automatically accessing a particular field of a license associated with the application program and extracting the product ID therefrom). The client computer 218 can also include a product ID validator 222 which validates, during installation of the application program, the product ID 212. In one embodiment, the validation can be performed using the genus 2 curve-based decryption techniques and/or systems described herein. If the validator 222 determines that the product ID is valid, an appropriate course of action can be taken (e.g., an installation program on software media 210 allows the application to be installed on computer 218). However, if the validator 222 determines that the product ID is invalid, a different course of action can be taken (e.g., the installation program terminates the installation process preventing the application program from being installed).

In one embodiment, the product ID validator 222 can also optionally authenticate the software media (e.g., application program) based on the product ID 212. This authentication verifies that the product ID 212 entered at computer 218 corresponds to the particular copy of the application be accessed, for example. As an example, the authentication may be performed at different times, such as during installation, or when requesting product support or an upgrade. Alternatively, in this embodiment, the authentication may be performed at a remote location (e.g., at a call center when the user of client computer 218 calls for technical support, the user may be required to provide the product ID 212 before receiving assistance).

In one embodiment, if an application program manufacturer desires to utilize the authentication capabilities of the product ID, the product ID generated by generator 204 for respective copies of an application program should be unique. As an example, unique product IDs can be created by assigning a different initial number or value to respective copies of the application program (e.g., this initial value is then used as a basis for generating the product ID). The unique value associated with the copy of the application program can be optionally maintained by the manufacturer as an authentication record 208 (e.g., a database or list) along with an indication of the particular copy of the application program. The indication of the copy can be, for example, a serial number embedded in the application program or on software media 210, and may be hidden in any of a wide variety of conventional manners. Alternatively, for example, the individual number itself may be a serial number that is associated with the particular copy, thereby allowing the manufacturer to verify the authenticity of an application program by extracting the initial value from the product ID and verifying that it is the same as the serial number embedded in the application program or software media 210.

A method may be devised that can allow a genus 2 curve to be generated, where a group (e.g., comprising points or elements) can be created from the genus 2 curve and the group can be used for cryptography. Generating a genus 2 curve for use in cryptography is known to be a difficult problem, with merely partial solutions in some cases. Effective cryptosystems are typically based on groups where a Discrete Logarithm Problem (DLP) for the group is hard (e.g., difficult to calculate), such as a group comprising points generated from the genus 2 curve. The DLP applies to groups, which is a collection of elements together with a binary operation, such as a group multiplication. As an illustrative example, the DLP may be: given an element g in a finite group G and another element h that is an element of G, find an integer x such that $g^x = h$.

Figure 3:
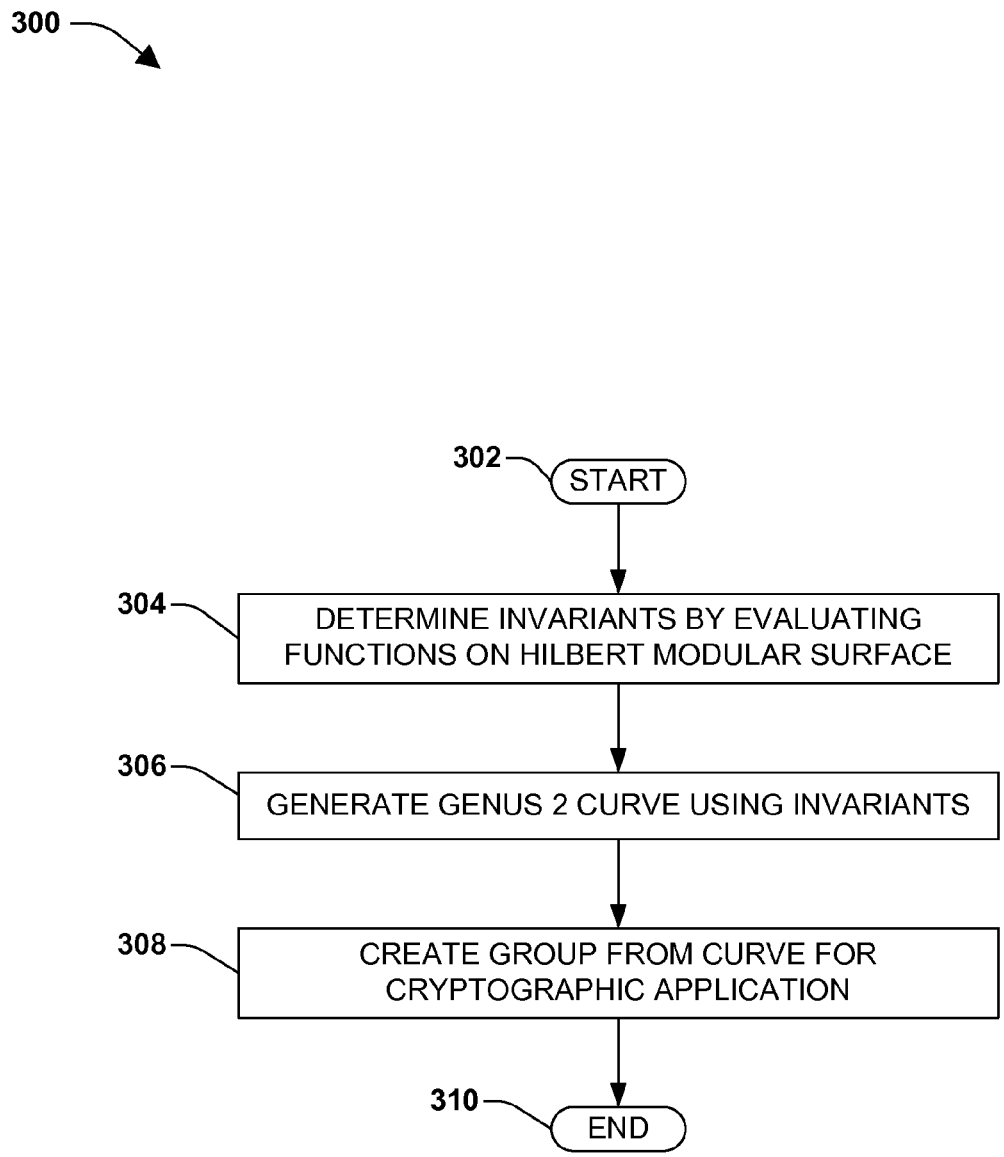
FIG. 3 is a flow-chart diagram of an example method for generating a genus 2 curve for use in cryptography.

FIG. 3 is a flow-chart diagram of an exemplary method 300 for generating a genus 2 curve for use in cryptography. The exemplary method 300 begins at 302 and involves determining one or more invariant values, such as polynomials, for a genus 2 curve by evaluating one or more invariant functions on a Hilbert modular surface, at 104. Algebraic curves can be described by an equation (formula), such as $y^2 = x^5 + x^4 + 3x^3 \ldots$, where the values of the equation (e.g., $x^5$) can be generated by invariant functions. The invariant functions are typically functions of a coefficient of a curve, which are "invariant" (e.g., don't change) under transformations of the curve.

Previously, to construct a genus 2 curve for cryptographic purposes three auxiliary polynomials with rational coefficients, such as Igusa invariants, are computed. As an illustrative example, these polynomials may have a form of $X^5 + aX^4 + bX^3 + dX^2 + eX + f$, where a, b, c, d, e, f are fractions. In this example, while the number 5 occurring in $X^5$ is used for illustration purposes, this number may be much larger. Further, in this example, in order to generate the genus 2 curve three polynomials are computed, which is very computationally expensive.

In this exemplary method 300, invariant functions are evaluated on the Hilbert modular surface to create improved invariant values, such as polynomials for generating the genus 2 curve equation, for example. In this example, the improvement is achieved by merely utilizing two invariant functions for generating the genus 2 curve, instead of three Igusa invariants previously used. Further, the improved invariant values on the Hilbert Modular surface are typically easier to calculate than the Igusa polynomials.

In one embodiment, determining the invariant values can comprise evaluating one or more invariant functions on complex multiplication (CM) points on a Hilbert modular surface. Descriptions of CM points in the Hilbert moduli space is simpler than a description of CM points in terms of period matrices on the Siegel moduli space (e.g., as with Igusa invariants). Additionally, modular forms evaluated to compute invariants on the Hilbert moduli space are exponential functions in two variables, instead of three, as with the Igusa polynomials previously used.

In one embodiment, invariant values can be determined by fixing a real quadratic field F. The Hilbert moduli space of principally polarized abelian surfaces can then be considered with real multiplication by $O_F$. In this embodiment, using a forgetful functor one can map to the Siegel moduli space of the principally polarized abelian surfaces. Two generators of the function field of the Hilbert moduli space can be studied, for example, as given by K. B. Gundlach, in Die Bestimmung der Funktionen zur Hilbertschen Modulgrupper des Zahlkörpers Q($\sqrt{5}$), Math. Ann. 152 (1963), 226-256.

At 306, the genus 2 curve is generated using the one or more invariant values. In one embodiment, a genus 2 curve can be given by $y^2=f(x)$ (curve equation) over a finite field $F_p$, where p is a prime number and where f is a polynomial of degree 2g+1 and g is the genus of the genus 2 curve. In this embodiment, for example, desired (e.g., minimal) polynomials determined by evaluating the invariant functions on the Hilbert modular surface can be used to generate the curve equation for the genus 2 curve.

At 308, a group is created from the curve, where the group is used for a cryptographic application. For example, a group (e.g., a set of elements and an operation that forms an algebraic structure) generated from the genus 2 curve can have a solution for a discrete logarithm problem (DLP) that is considered hard. In this example, a group having a hard DLP solution can be desirable for use in cryptographic applications, such as for secure computer-based communications. In one embodiment, the group may be created by determining one or more Jacobian determinants (Jacobians) of the function of the genus 2 curve. A group comprising Jacobians of the curve is generally considered to have a hard DLP solution, and can be very useful in a cryptographic application.

As an example, the group may be used for cryptographic applications, such as: digital signatures that securely identify a person or document, encryption and decryption of electronic documents, and/or keys, and public and private keys that are used in online communications. Having created a group for use in a cryptographic application, the exemplary method 300 ends at 310.

In one aspect, determining invariants for the genus 2 curve can involve defining new invariants, which are different from previously utilized Igusa invariants for creating a genus 2 curve. In this aspect, in one embodiment, a Hilbert Eisenstein series can be computed for the invariant functions, the new invariants can be defined, and a pull-back of the Igusa functions in terms of the new invariants can be computed.

For example, let $$F = Q(\sqrt{5}) \text{ and } \varepsilon = \frac{1+\sqrt{5}}{2},$$

where F is a quadratic field of the group represented the quartic polynomial function Q of the square root of 5 and $\epsilon$ represents a unit for the group. In this example, some basic facts on symmetric Hilbert modular forms, such as for $SL_2(O_F)$, the Eisenstein series of even weight k≧2 is given as:

$$G_k(z) = 1 + \sum_{t=a+b\frac{1-\sqrt{5}}{2} \in O_F^+} b_k(t) q_1^a q_2^a,$$

where $$b_k(t) = \kappa_k \sum_{(\mu) \supset (t)} N(\mu)^{k-1}.$$

Here $$\kappa_k = \frac{(2\pi)^{2k}\sqrt{5}}{(k-1)!^2 5^k \zeta_F(k)}$$

is a rational number, ($\mu$) denotes the principal ideal $\mu O_F$, and $N(\mu)=\#O_F/(\mu)$.

Here are some values of $\kappa_k$ are:

$$\kappa_k \begin{cases} 2^3 \cdot 3 \cdot 5 & \text{if } k=2, \\ 2^4 \cdot 3 \cdot 5 & \text{if } k=4, \\ \frac{1}{67} \cdot 2^3 \cdot 3^2 \cdot 5 \cdot 7 & \text{if } k=6, \\ \frac{1}{412751} \cdot 2^3 \cdot 3 \cdot 5^2 \cdot 11 & \text{if } k=10. \end{cases}$$

A calculation gives the first few coefficients for $$0 < a \le 3, \frac{1-\sqrt{5}}{2}a < b < \frac{1+\sqrt{5}}{2}a$$

as follows:

$$G_k(z) = 1 + \kappa_k(1+q_2)q_1 +$$
$$\kappa_k[q_2^{-1} + (1+4^{k-1}) + (1+5^{k-1})q_2 + (1+4^{k-1})q_2^2 + q_2^3]q_1^2 +$$
$$\kappa_k \begin{bmatrix} (1+5^{k-1})q_2^{-1} + (1+9^{k-1}) + (1+11^{k-1})q_2 + \\ (1+11^{k-1})q_2^2 + (1+9^{k-1})q_2^3 + (1+5^{k-1})q_2^4 \end{bmatrix} q_1^3.$$

A Hilbert modular form $\theta$ is called symmetric if $\theta(z,z')=\theta(z',z)$ for $(z,z') \in H^2$. Further, in this example, for a ring R, denote $$M^{Sym}(SL_2(O_F), R) = \sum_{k \ge 0} M_k^{Sym}(SL_2(O_F), R)$$

for a graded ring of holomorphic symmetric Hilbert modular forms of $SL_2(O_F)$ with Fourier coefficients in R. When R=Z, one can drop R in the notation.

In one embodiment, in this aspect, let $$\theta_6 = -\frac{67}{2^5 3^3 5^2}(G_6 - G_2^3),$$

$$\theta_{10} = 2^{-10} 3^{-5} 5^{-5} 7^{-1}(412751 G_{10} - 5 \cdot 67 \cdot 2293 G_2^2 G_6 + 2^2 \cdot 3 \cdot 7 \cdot 4231 G_2^5),$$

$$\theta_{12} = 2^{-2}(\theta_6^2 - G_2 \theta_{10}).$$

In this embodiment, then functions $G_2$, $\theta_6$, and $\theta_{10}$, and $\theta_{12}$ can be primitively integral symmetric Hilbert modular forms, for example and can be a minimal set of generators for $M^{Sym}(SL_2(O_F), Z)$.

Additionally, in this embodiment, the ring of symmetric holomorphic Hilbert modular forms for $SL_2(O_F)$ is a polynomial ring of $G_2$, $G_6$, and $\theta_{10}$, such that $\dim M_k^{Sym}(SL_2(O_F))=\#\{(x,y,z)\in Z_{\geq 0}^3 : x+3y+5z=k/2\}$. In this embodiment, the field of symmetric meromorphic Hilbert modular functions for $SL_2(O_F)$ are rational functions of $$J_1 = \frac{\theta_6}{G_2^3} \text{ and } J_2 = \frac{G_2^5}{\theta_{10}},$$

where J1 and J2 describe the new invariants (e.g., as alternates to using the Igusa invariants).

Additionally, in this embodiment, $\theta_i$ can be pull-backs of Siegel modular forms. For example, this can be proven by:

$$\phi^* \psi_4 = G_2^2,$$
$$\phi^* \psi_6 = -\frac{42}{25}G_2^3 + \frac{67}{25}G_6 = G_2^3 - 2^5 3^3 \theta_6,$$
$$-4\phi^* \chi_{10} = \theta_{10},$$
$$12\phi^* \chi_{12} = 3\theta_6^2 - 2G_2\theta_{10}.$$

In particular, in this example, $\theta_{10}$ can be $2^{-12}$ times the square of the product of the ten Hilbert theta constants defined by $\theta_{10} = 2^{-12}\Theta^2$, where $\Theta$ is the weight 5 modular form defined by Gundlach (see reference infra). Further, the following proposition expresses the pull-back of Igusa's functions in terms of the new invariants: one has $$\phi^* j_1 = 8J_2(3J_1^2 J_2 - 2)^5,$$
$$\phi^* j_2 = \frac{1}{2}J_2(3J_1^2 J_2 - 2)^3,$$
$$\phi^* j_3 = 2^{-3}J_2(3J_1^2 J_2 - 2)^2(4J_1^2 J_2 + 2^5 \cdot 3^2 J_1 - 3).$$

Figure 4:
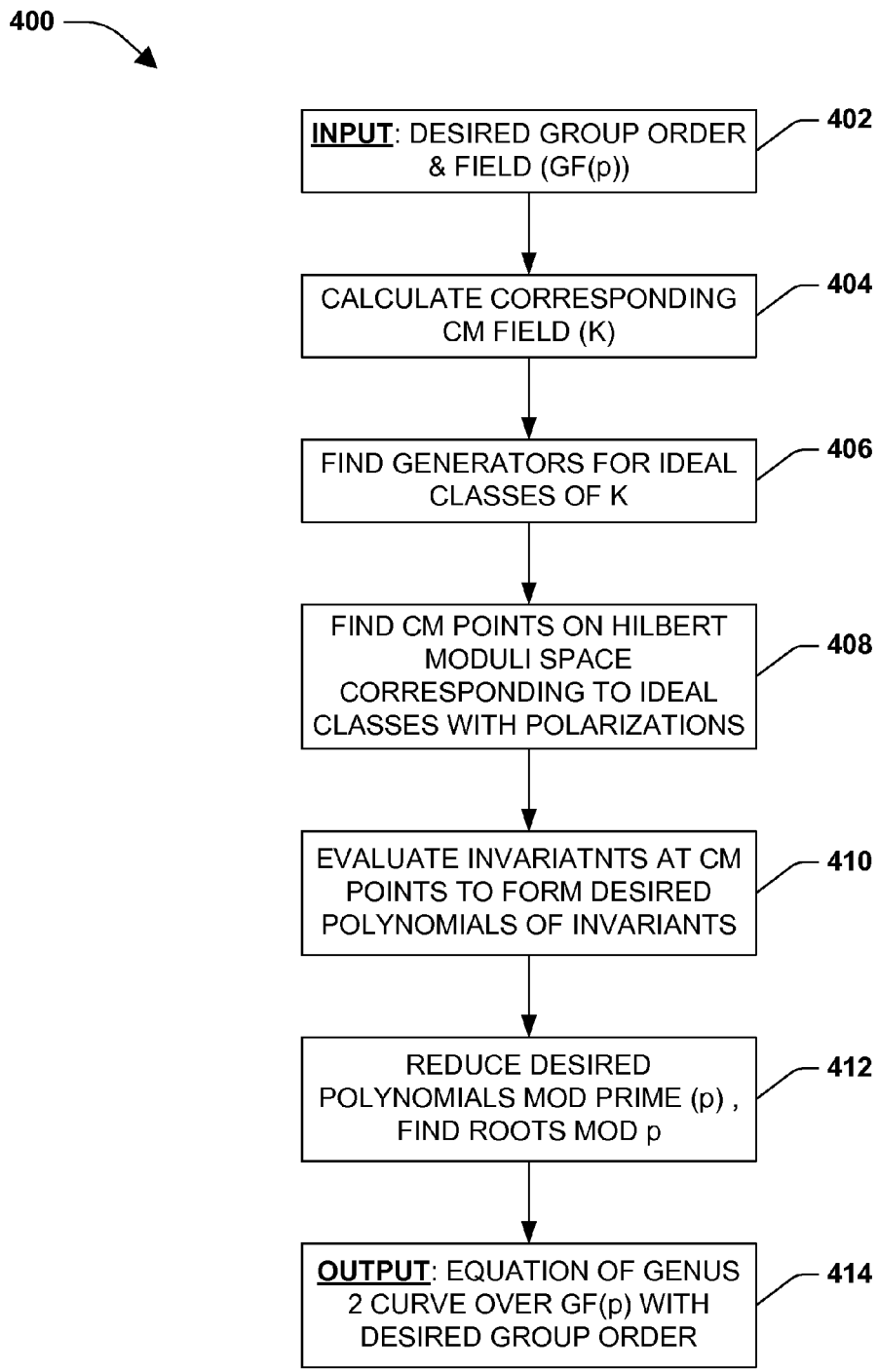
FIG. 4 is a flow diagram of one embodiment of how a genus 2 curve is generated using the one or more invariant values.

FIG. 4 is a flow diagram of one embodiment 400 of how a genus 2 curve is generated using the one or more invariant values, for example, for use in cryptography. The exemplary embodiment 400 of the method begins at 402 where a desired group and group field (GF(p)) are input. For example, a desired number of elements for the group can be chosen as the group order, and the field from which elements in the set of elements for the group can be drawn is chosen for the field.

At 404, a CM field (K) is calculated for the corresponding group order and GF(p). For example, for a finite (GF(p), the K for the group field, given the order, can be an extension of (GF(p) comprising elements and an operation used for calculating a genus 2 curve. At 406, one or more generators are determined for ideal classes of the CM field. At 408 of the exemplary embodiment 400, CM points on a Hilbert moduli space are determined, corresponding to the ideal classes with polarizations.

In one embodiment, let the CM field $K=F(\sqrt{\Delta})$ be a non-biquadratic quartic CM extension of field $F=Q(\sqrt{5})$. Further, in constructing CM points, let $\Phi=\{\sigma_1, \sigma_2\}$ be a CM type of K. A CM point in $X=SL_2(O_F)\backslash H^2$ of CM type $(O_K, \Phi)$ can be an image of a point $\Phi(z)=\sigma_1(z), \sigma_2(z))\in H^2$, where $z\in K$ satisfies the condition that $\Lambda_z=O_F+O_F z$ is a fractional ideal. Conversely, if "a" is a fractional ideal of K, one can write: $a=O_F\alpha+O_F\beta$, $\alpha, \beta\in a$, as F has class number one.

Additionally, as F can have a unit of norm one, one can find generator $\alpha$ and $\beta$ (e.g., multiplying by such a unit if necessary) such that $$\Phi\left(\frac{\beta}{\alpha}\right) \in H^2.$$

So $z = \frac{\beta}{\alpha}$ gives a CM point $\Phi(z)$ of CM type $(O_K, \Phi)$, and its associated lattice is $\Lambda_z=\alpha a$. Moreover, this CM point $z\in X$ can depend merely on the ideal class [a] of "a", denoted it by $z(a, \Phi)$ or $z([a], \Phi)$. The correspondence $[a] \mapsto z([a], \Phi)$ can give rise to a bijection between the ideal class group $CL(K)$ and the set of CM points of CM type $(O_K, \Phi)$. The inverse of which is $z \mapsto [\Lambda_z]$.

In this embodiment, $CM(K, \Phi)$ can be written as a formal sum of the CM points of CM type $(O_K, \Phi)$, and viewed as a 0-cycle in X, where X has a canonical model over Q (e.g., as a coarse moduli space of $\partial_F^{-1}$-polarized abelian surfaces with real multiplication by $O_F$). Furthermore, $(CM(K, \Phi)$ can be defined over a reflex field $\tilde{K}$ of $(K, \Phi)$ (e.g., as moduli space of $\partial_F^{-1}$-polarized abelian surfaces with complex multiplication $O_K$ with an extra condition on differentials related to $\Phi$). Where $\Phi'=\{\sigma_1, \overline{\sigma_2}\}$ is another CM type $\Phi$, $CM(K)=CM(K, \Phi)+CM(K, \Phi')$ can be defined over Q.

Additionally, the same lemma asserts that $CM(K, \Phi)$ is defined over Q itself when K is cyclic. Here, if $\Phi(z)$ is a CM point of CM type $(O_K, \Phi)$ associated to the ideal "a", for example, $\Phi'(\epsilon z)=(\sigma_1(\epsilon z), \overline{\sigma_2(\epsilon z)})$ is a CM point of CM type $(O_K, \Phi')$ associated to the same ideal "a", where $\epsilon$ is a unit of F such that $\sigma_1(\epsilon)>0$ and $\sigma_2(\epsilon)<0$.

As an example, let $J=J_1$ or $J_2$. J is a rational function on X, J(z) is algebraic over Q, and $$J(CM(K)) = \prod_{z\in CM(K)} J(z) \in Q.$$

However, J(z) is not an algebraic integer, in this example, and J(CM(K)) is not an integer. To compute J(z), an upper bound for the denominators of the coefficients of the minimal polynomial is used.

This can be done, for example, by using a notation, such as where $\tilde{K}$ is a reflex field of $(K, \Phi)$. In this example, it is also a quartic CM number field with real quadratic subfield $\tilde{F}$. Here, let $d_{\tilde{K}/\tilde{F}}$ be a relative discriminant of $\tilde{K}/\tilde{F}$ and $d_{\tilde{K}}$ be an absolute discriminant of $\tilde{K}$. For a nonzero element $$t \in d_{\tilde{K}/\tilde{F}}^{-1}$$

and a prime ideal I of $\tilde{F}$, define $$B_t(I) = \begin{cases} 0 & \text{if } I \text{ is split in } \tilde{K}, \\ (ord_I t + 1)\rho(t d_{\tilde{K}/\tilde{F}} I^{-1})\log|I| & \text{if } I \text{ is non-split in } \tilde{K}, \end{cases}$$

and $$B_t = \sum_I B_t(I).$$

Here $|I|$ is a norm of I, and $\rho(a)=\rho_{\bar{K}/\bar{F}}(a)$ can be defined as $\rho(a)=\#\{A \subset O_{\bar{K}}: N_{\bar{K}/\bar{F}}A=a\}$. For a positive integer m>0, set $$b_m = \sum_{\substack{t=\frac{n+m\sqrt{q}}{2p} \in d_{\bar{K}/\bar{F}}^{-1} \\ |n|<m\sqrt{q}}} B_t. \quad (23)$$

Here, $e^{b_m}$ are positive integers. Also, let $W_K$ be a number of roots of unity in K, then one can have $$W_K = \begin{cases} 10 & \text{if } K = Q(e(1/5)), \\ 2 & \text{otherwise.} \end{cases}$$

At 410, in the exemplary method 400, the invariants at the CM points are evaluated to form desired polynomials of the invariants. For example, in one embodiment, $J_i(z([a],\Phi))$ and $J_i(z([a],\Phi'))$ (e.g., the new invariants) are calculated using the following: let $h=h_K$ be the ideal class number of K, and assume $G_2(z)\neq 0$ and $d_K=5^2 q$ for a prime $q\equiv 1 \mod 4$. Further, let $$P_2(x) = \prod_{z \in CM(K)} (x - J_2(z)) = \sum_{i=1}^{2h} a_i(J_2)x^i \in Q[x].$$

Then $a_i(J_2) \in Q$ with denominator being a factor of $$e^{\frac{W_K}{2}b_1}.$$

Also, $$a_0(J_2) = \left(\frac{n^5}{e^{b_1}}\right)^{\frac{W_K}{2}}$$

for some integer n.
In this example, let $$P_1(x) = \prod_{z \in CM(K)} (x - J_1(z)) = \sum_{i=1}^{2h} a_i(J_1)x^i \in Q[x].$$

Then $a_i(J_1) \in Q$ with denominator being a factor of $$n^{\frac{3W_K}{2}}.$$

Further, in this embodiment, the desired polynomial (e.g., minimal polynomials) $P_1(X)$ and $P_2(X)$ are formed.

At 412, in the exemplary embodiment 400, the desired polynomials are reduced modulo a prime (p) and roots modulo the prime are determined. For example, the polynomials are reduced modulo p, not dividing the denominators, and finding the roots (mod p).

At 414, the roots are applied to Mestre's algorithm, pulled back to the Hilbert moduli space, to generate the genus 2 curve, where the output is the equation of the genus 2 curve over the GF(p) having the desired group order, at 416. For example, $\phi^* j_i \pmod{p}$ can be calculated using the formulas (described above):

$$\phi^* j_1 = 8J_2(3J_1^2 J_2 - 2)^5,$$

$$\phi^* j_2 = \frac{1}{2}J_2(3J_1^2 J_2 - 2)^3,$$

$$\phi^* j_3 = 2^{-3} J_2(3J_1^2 J_2 - 2)^2 (4J_1^2 J_2 + 2^5 \cdot 3^2 J_1 - 3).$$

Mestre's algorithm can then be applied to construct a genus 2 curve over the finite field $F_p$. In one embodiment, a variation of Mestre's algorithm can be used to generate the curve, using the invariant values. For example, Mestre's algorithm has previously been used to generate a genus two curve with Igusa invariants. In this example, let k be a field of characteristic not equal to 2. Here a genus curve x over k is determined by its Igusa invariants $j_i(X) \in F$.

Conversely, however, given $j_i \in k$, one might not always find a genus two curve X defined over k such that $j_i(X) = j_i$ although such a curve X exists over a finite extension of k. This may be due to a subtle difference between the definition field of x as a point in $C_2(k)$ (e.g., field of moduli) and a definition field of x as a curve (e.g., the 'minimal' field where X has a model). Mestre discovered an algorithm to tell whether such a curve X over k exists and how to construct a model of X over k if it exists. Using Mestre's definition one can get a formula for x, y, z in terms of Igusa's A, B, C, and D as follows: set $$x = \frac{8}{225}\left(1 + 20\frac{B}{A^2}\right)$$

$$y = \frac{16}{3375}\left(1 + 80\frac{B}{A^2} - 600\frac{C}{A^3}\right)$$

$$z = \frac{-64}{253125}$$

$$\left(-108 \cdot 10^5 \frac{D}{A^5} - 9 - 700\frac{B}{A^2} - 3600\frac{C}{A^3} + 12400\frac{B^2}{A^4} - 48 \cdot 10^3 \frac{BC}{A^5}\right).$$

In terms of the Igusa invariants, one has $$x = \frac{8}{225}\left(1 + 20\frac{j_2}{j_1}\right)$$

$$y = \frac{16}{3375}\left(1 + 80\frac{j_2}{j_1} - 600\frac{j_3}{j_1}\right)$$

$$z = \frac{-64}{253125}$$

$$\left(-108 \cdot 10^5 \frac{1}{j_1} - 9 - 700\frac{j_2}{j_1} - 3600\frac{j_3}{j_1} + 12400\left(\frac{j_2}{j_1}\right)^2 - 48 \cdot 10^3 \frac{j_2}{j_1}\frac{j_3}{j_1}\right).$$

Let $L \in P^2$ be Mestre's conic given by the equation $v^t L v = 0$ with variables $v = (v_1, v_2, v_3)^t$ and $$L = \begin{pmatrix} x + 6y & 6x^2 + 2y & 2z \\ 6x^2 + 2y & 2z & 9x^3 + 4xy + 6y^2 \\ 2z & 9x^3 + 4xy + 6y^2 & 6x^2 y_2 y^2 + 3xz \end{pmatrix}$$

Let M be Mestre's cubic curve in $P^2$ given $$\sum_{1 \leq i,j,k \leq 3} c_{ijk} v_1 v_2 v_3 = 0.$$

Here $c_{ijk}$ are given by $$c111 = 36xy - 2y - 12z, c112 = -18x^3 - 12xy - 36y^2 - 2z,$$

$$c113 = -9x^3 - 36x^2y - 4xy - 6xz - 18y^2, c122 = c113,$$

$$c123 = -27x^4 - 18x^2y - 18xy^2 - 3xz - 2y^2 - 12yz,$$

$$c133 = -\frac{27}{2}x^4 - 72x^3y - 6x^2y - 9x^2z) - 39xy^2 - 36y^3 - 2yz$$

$$c222 = -81x^4 - 54x^2y - 18xy^2 - 8y^2 + 6yz$$

$$c223 = 9x^3y - 27x^2z + 6xy^2 18y^3 - 8yz$$

$$c233 = -\frac{81}{2}x^5 - 27x^3y - 9x^2y^2 - 4xy^2 + 3xyz - 6z^2$$

$$c333 = \frac{81}{2}x^4y - \frac{81}{2}x^3z + 27x^2y^2 + 9xy^3 - 18xyz + 4y^3 - 30y^2z$$

To get the equation used for the genus 2 curve generation described above from Mestre's, one can write the curve M in terms of $v_i$ instead of his $x_i$, then divide the resulting equation by $2^{67} \cdot 3^{22} \cdot 5^{23} I_2^{23} I_{10}^{12}$. Here, $c_{ijk}$ are absolute invariants while $a_{ijk}$ are not. The genus two curve X with Igusa invariants $j_i(X)=j_i$ has a model over a field k of characteristic not equal to 2 if and only if L(k) is not empty.

In one embodiment, it can be rephrased as follows:
(1) X has a model over k.
(2) The conic curve L has a rational point over k.
(3) The ternary quadratic form Q associated to the matrix L represents 0 in k.
(4) Let $V=k^3$ be with the quadratic form $Q(v)=v^tLv$, and let $B=C^+(V)$ be the associated even Clifford algebra, which is a quaternion algebra over k. Then B is isomorphic to the matrix algebra $M_2(k)$ over k.

In this embodiment, suppose the conic L has a rational point over k. Using this point, rewrite it as parametric function $v_i=\theta_i(t)$. for some quadratic polynomial of t. For example, this gives an explicit isomorphism between L and $P^1$ over k. These equations can be plugged into the equation for the cubic curve M to obtain a polynomial equation of t of degree 6, such as $\theta(t)=0$. Then the genus two curve C can be given by $X:s^2=\theta(t)$.

In one embodiment, the generation of the genus 2 curve may be described as using a variation of Mestre's algorithm, where Mestre's algorithm is pulled back to a Hilbert moduli space. In this embodiment, the Igusa invariants are pulled back to invariants on a Hilbert modular space, as described above. Further, the invariant values are expressed on a Hilbert modular space in terms of generators given by the one or more invariant functions on a Hilbert modular surface.

Figure 5:
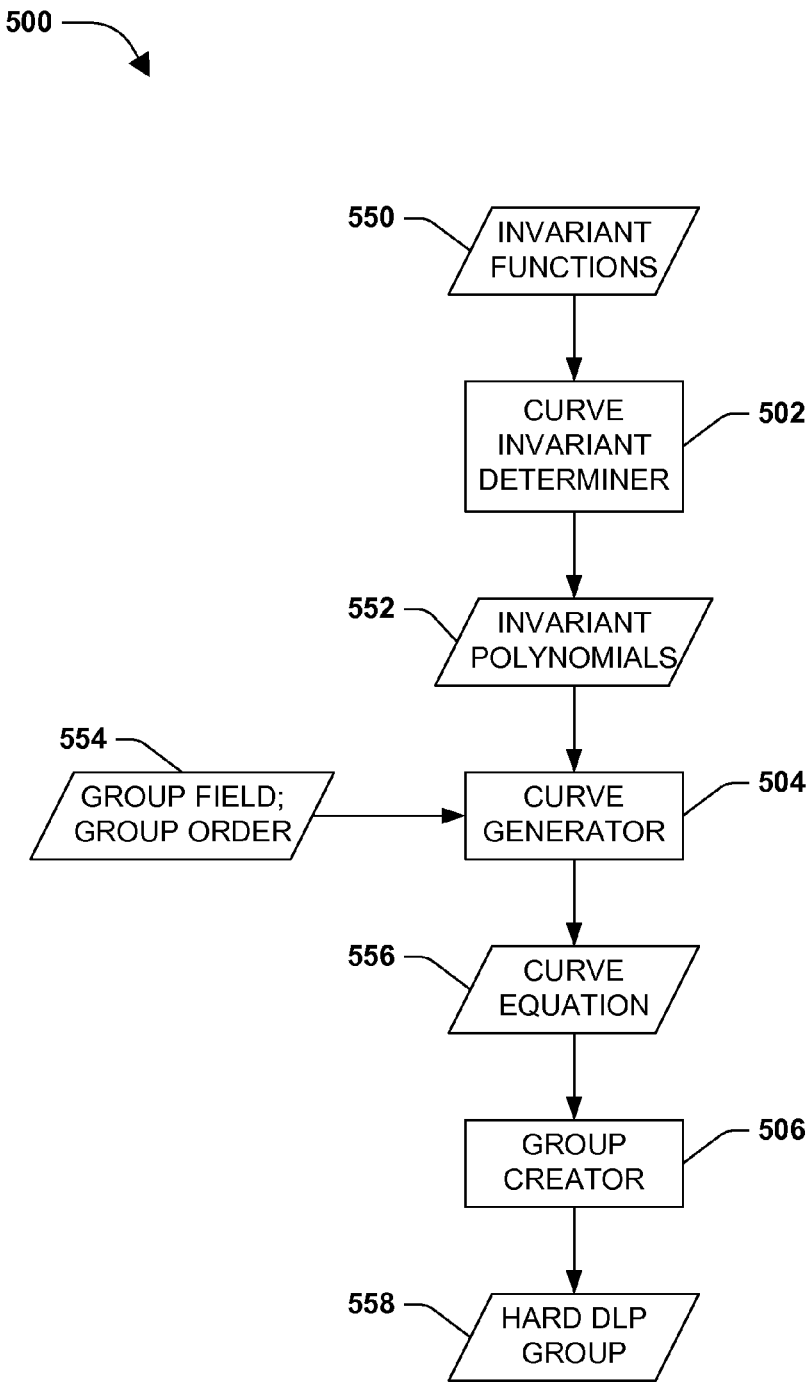
FIG. 5 is a component-block diagram of an exemplary system for generating a genus 2 curve for use in cryptography.

A system can be devised that can compute genus 2 curves, for example, by defining a set of invariants simpler than previously used Igusa invariants. Components of the system can consider the Hilbert moduli space and study the generators of a function field of the Hilbert moduli space to generate genus 2 curves, for example, with a Jacobian determinant (Jacobian) of given order. FIG. 5 is a component-block diagram of an exemplary system 500 for generating a genus 2 curve for use in cryptography.

A curve invariant determination component 502 is configured to determine genus 2 curve invariant polynomials 552 by evaluating invariant functions 550 on a Hilbert modular surface. A curve generation component 504 is configured to generate a genus 2 curve 556 using the genus 2 curve invariant polynomials 552. A group creation component 506 is configured to create a group 558 from the genus 2 curve 556 where the group is used for a cryptographic application.

In one embodiment, one or more of the components of the exemplary system 500 may comprise a microprocessor or other computer-based processing device that is programmed to perform a function of the component. For example, the curve invariant determination component 502 may comprise a microprocessor that is programmed to determine the invariant polynomials 552 for a genus 2 curve.

In one embodiment, the curve invariant determination component 502 can be configured to determine genus 2 curve invariant polynomials by evaluating one or more invariant functions on complex multiplication (CM) points on a Hilbert modular surface. Further, the curve generation component 504 can generate the genus 2 curve 556 using the genus 2 curve invariant polynomials 552, and a desired group field and group order 554 (e.g., number of elements in the group). Additionally, the group 558 generated by the group creation component 506 comprise a discrete logarithm problem (DLP) solution that is hard to solve. In this way, for example, the group may be desirable for use in cryptographic applications, such as encryption and decryption of documents.

Figure 6:
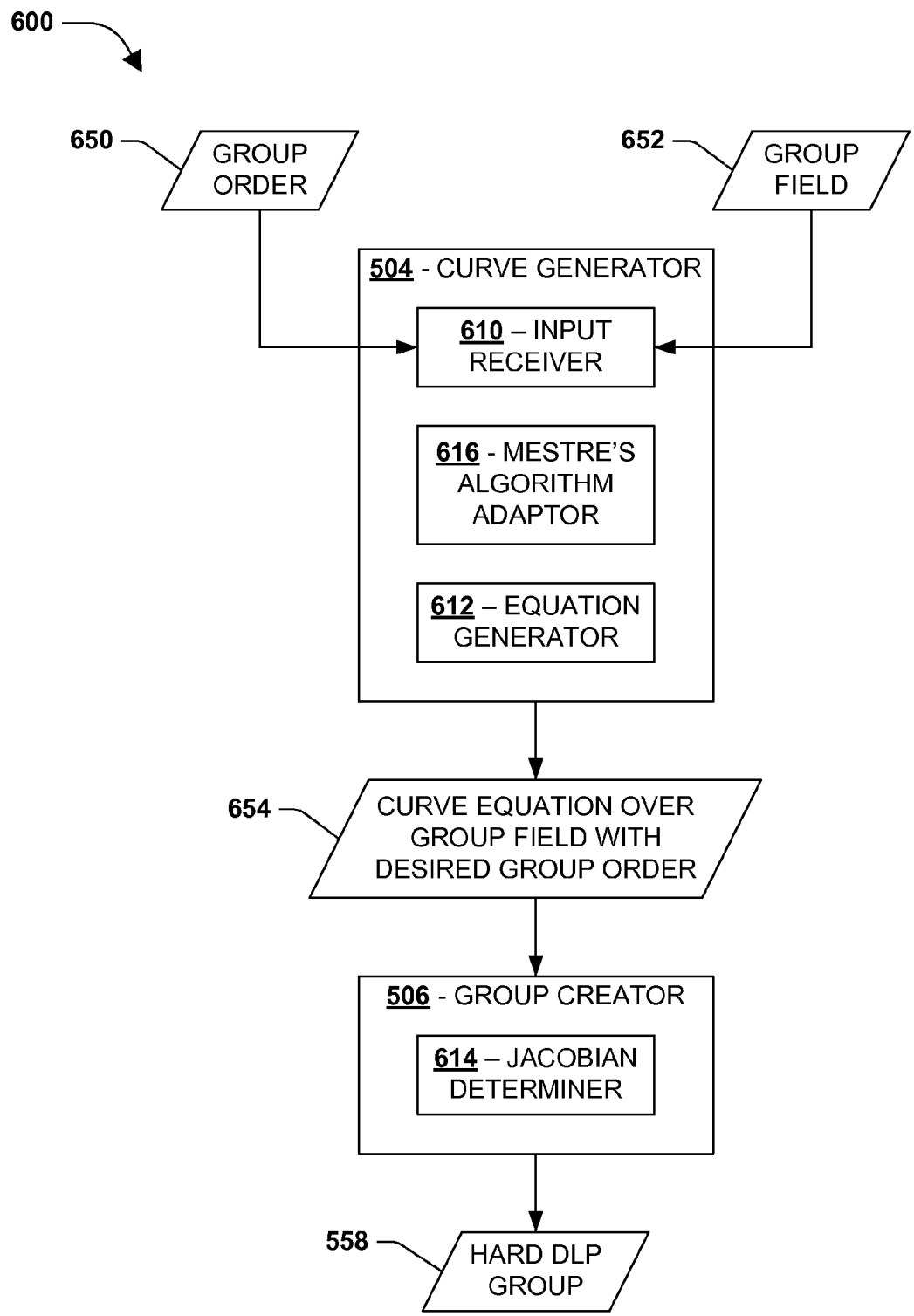
FIG. 6 is a component block diagram of one example embodiment of a portion of a system described herein.

FIG. 6 is a component block diagram of one exemplary embodiment 600 of a portion of the systems, described herein. The curve generation component 504 comprises an input receiving component 610 that receives input, such as a desired group order for the genus 2 curve 650, and a group field for the genus 2 curve 652. Further, the curve generation component 504 comprises a genus 2 curve equation generation component 612 that can generate the equation of the genus 2 curve over the group field with the desired group order.

Additionally, the exemplary embodiment 600 comprises a Mestre's algorithm adaptation component 616 that can adapt the Mestre's algorithm for generating the genus 2 curve to an algorithm that uses the invariant polynomials 552 on a Hilbert modular surface to generate the genus 2 curve 654. In one embodiment, the Mestre's algorithm adaptation component 616 is disposed in the curve generation component 504 to facilitate generating the genus 2 curve equation 654.

In one embodiment, in order to facilitate generating the genus 2 curve equation 654, the Mestre's algorithm adaptation component 616 can pull back Igusa invariants to invariants on a Hilbert modular space. Further, the Mestre's algorithm adaptation component 616 can express the invariant polynomials 552 on a Hilbert modular space in terms of generators given by the one or more invariant functions on a Hilbert modular surface.

Additionally, in the exemplary embodiment 600, the group creation component 506 comprises a Jacobian determination component 614 that determines a Jacobian of the genus 2 curve to create a group 558 used for the cryptographic application. For example, a group created from the Jacobian can have a DLP solution that is hard, therefore being desirable for cryptographic applications.

Figure 7:
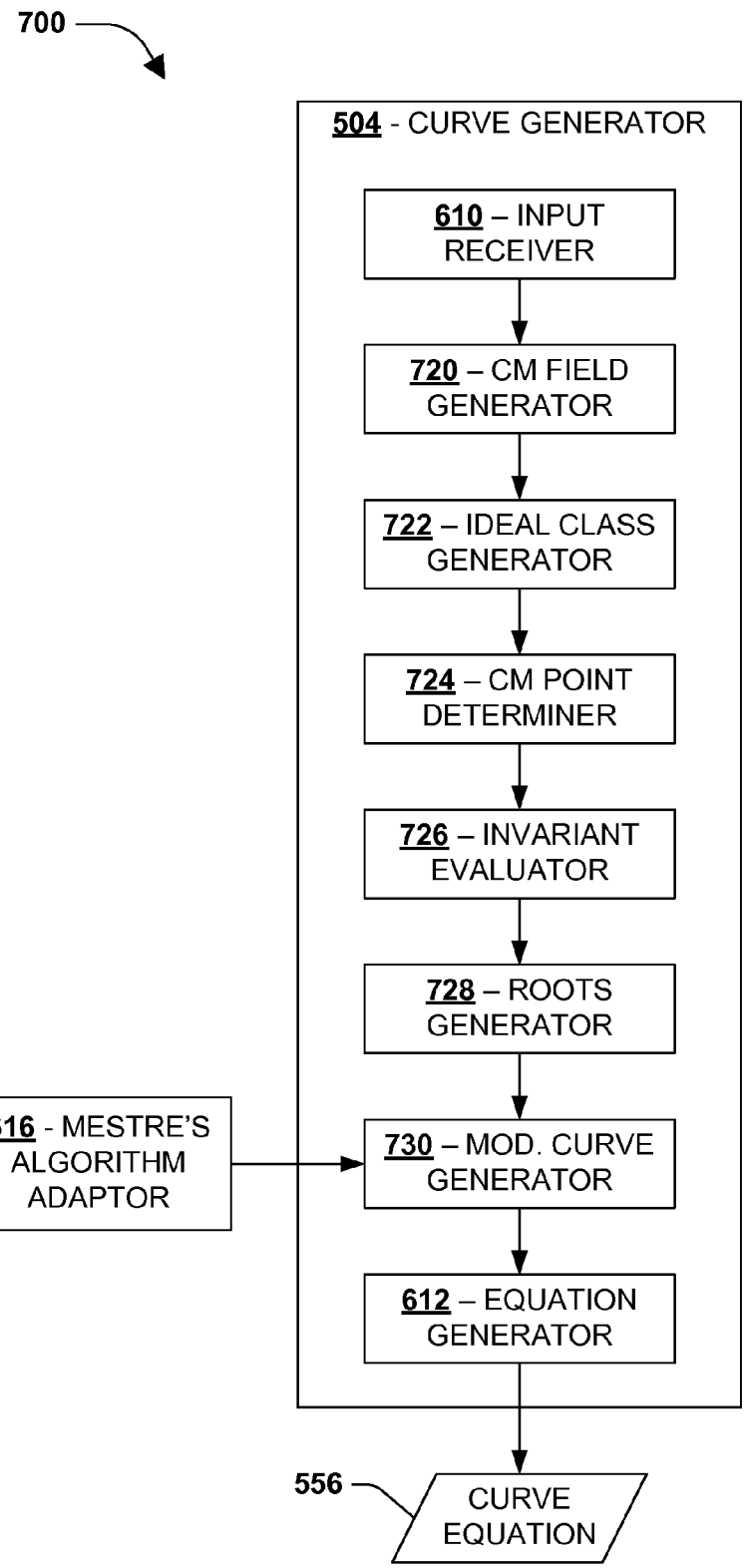
FIG. 7 is a component block diagram of an example embodiment of a curve generation component.

FIG. 7 is a component block diagram of an exemplary embodiment 700 of a curve generation component 504. In this embodiment, the curve generation component 504 comprises a CM field generation component 720 operably coupled with the input receiving component 610 that calculates a complex multiplication (CM) field for the desired group order and group field. Further, an ideal class generation component 722 is operably coupled with the CM field generation component 720 and determines one or more generators for ideal classes of the CM field.

In this embodiment 700, the curve generation component 504 further comprises a CM point determination component 724 that is operably coupled with the ideal class generation component 722 and configured to determine CM points on a Hilbert moduli space corresponding to the ideal classes with polarizations. An invariant evaluation component 726 is operably coupled with the CM point determination component 724; it evaluates the invariants at the CM points to form desired polynomials of the invariants.

Further, in this embodiment 700, the curve generation component 504 comprises a roots generation component 728 that is operably coupled with the invariant evaluation component 726 and is configured to reduce the desired polynomials modulo a prime and determining roots modulo the prime. Additionally, a modified genus 2 curve generation component 730 is operably coupled with the roots generation component 728 and is configured to apply the roots to Mestre's algorithm pulled back to the Hilbert moduli space (e.g., as modified by the Mestre's algorithm adaptor 616) to generate the genus 2 curve (e.g., 556 of FIG. 5). In this way, for example, the curve can be used to generate a group having a hard DLP solution, used for cryptographic applications, as described above.

Figure 8:
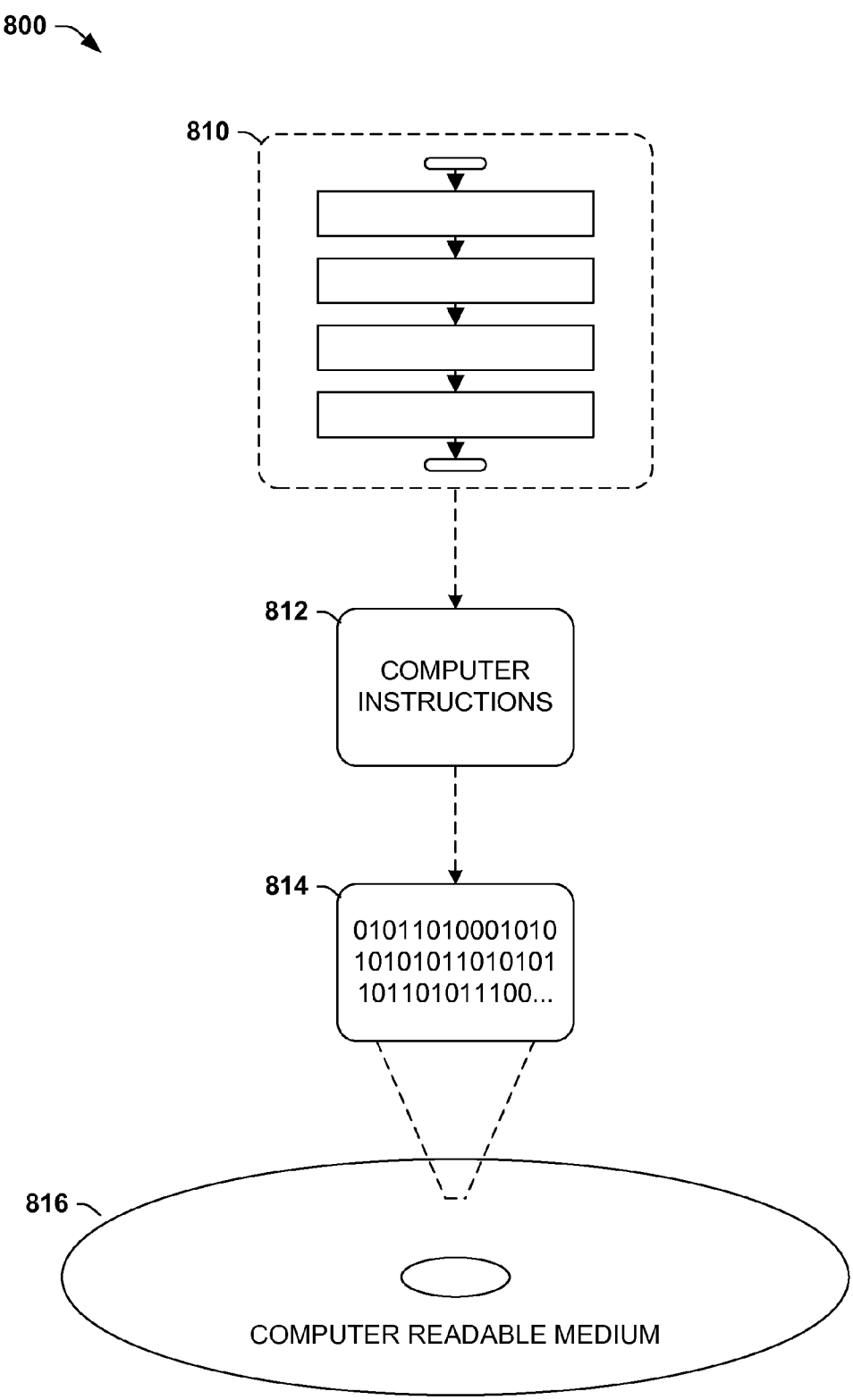
FIG. 8 is an illustration of an exemplary computer-readable medium that may be devised to implement one or more of the methods and/or systems described herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as the exemplary method 300 of FIG. 3, for example. In another such embodiment, the processor-executable instructions 804 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
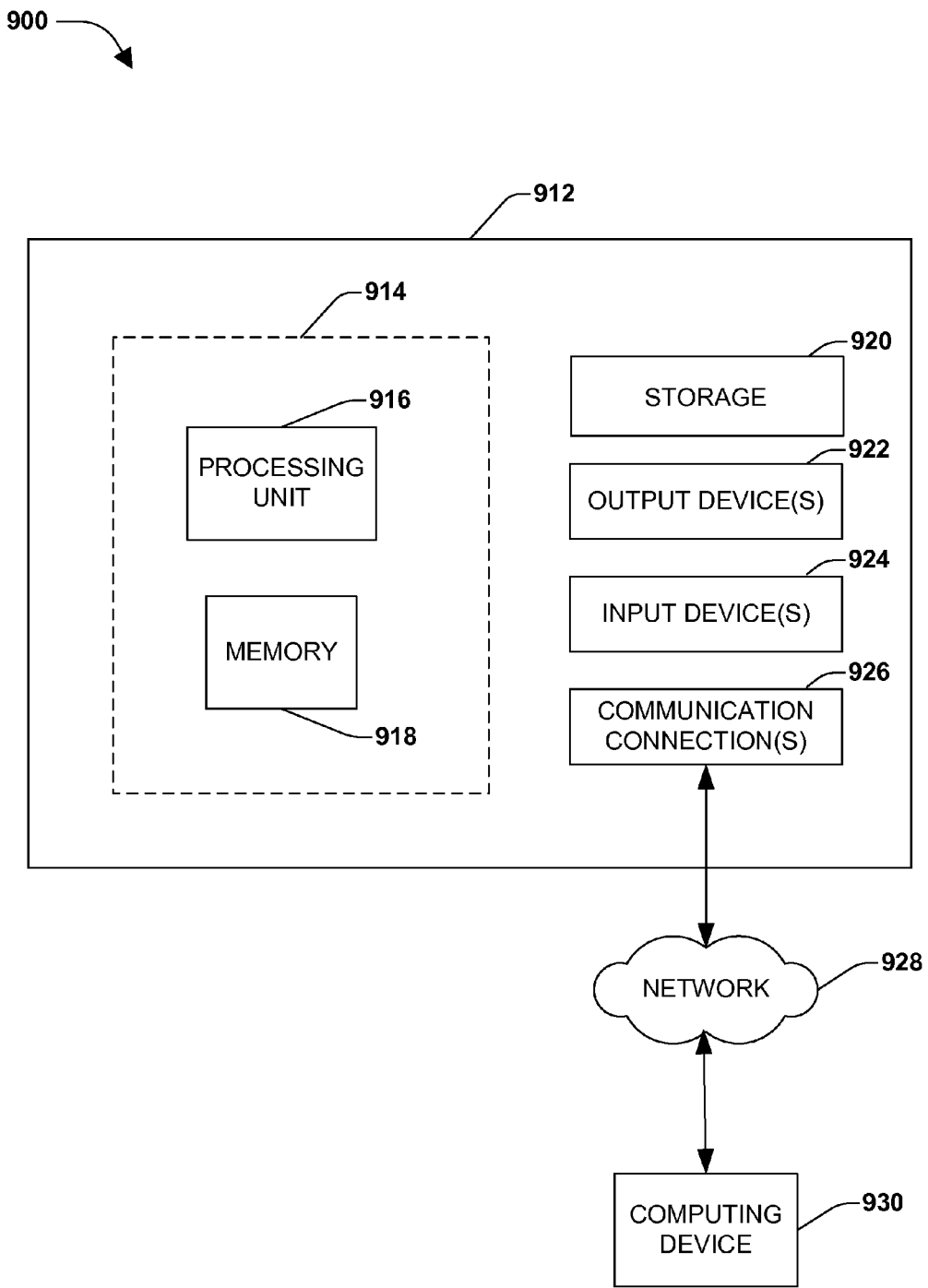
FIG. 9 is a component block diagram of an exemplary environment that may be devised to implement one or more of the methods and/or systems described herein.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for generating a genus 2 curve for use in cryptography comprising:
   determining one or more invariant values for a genus 2 curve by evaluating one or more invariant functions on a Hilbert modular surface;
   generating the genus 2 curve using the one or more invariant values; and
   creating a group from the genus 2 curve where the group is used for a cryptographic application, at least some of at least one of the determining, the generating, or the creating implemented at least in part via a processing unit.

2. The method of claim 1, determining one or more invariant values for a genus 2 curve by evaluating one or more invariant functions on a Hilbert modular surface comprising:
   determining at least two invariant values for the genus 2 curve by evaluating at least two invariant functions on the Hilbert modular surface.

3. The method of claim 2, determining at least two invariant values comprising:
   generating a first invariant value based upon complex multiplication (CM) points on the Hilbert modular surface; and
   generating a second invariant value based upon CM points on the Hilbert modular surface.

4. The method of claim 1, determining one or more invariant values for a genus 2 curve comprising:
   evaluating the one or more invariant functions on complex multiplication (CM) points on the Hilbert modular surface.

5. The method of claim 1, generating the genus 2 curve comprising:
   using a variation of Mestre's algorithm that utilizes the one or more invariant values.

6. The method of claim 5, generating the genus 2 curve using a variation of Mestre's algorithm comprising:
using Mestre's algorithm pulled back to a Hilbert moduli space to generate the genus 2 curve.

7. The method of claim 6, using Mestre's algorithm pulled back to a Hilbert moduli space to generate the genus 2 curve comprising:
pulling back Igusa invariants to invariants on the Hilbert moduli modular space; and
expressing the invariants on the Hilbert moduli modular space in terms of generators given by the one or more invariant functions on the Hilbert modular surface.

8. The method of claim 1, creating a group comprising:
determining a Jacobian of the genus 2 curve to create the group.

9. The method of claim 1, generating the genus 2 curve comprising:
using the one or more invariant values to generate an equation that describes the genus 2 curve.

10. The method of claim 9, generating the genus 2 curve using the one or more invariant values comprising:
inputting a desired group order and a group field; and
generating the equation over the group field with the desired group order.

11. The method of claim 10, comprising:
calculating a complex multiplication (CM) field for the desired group order and the group field;
determining one or more generators for ideal classes of the CM field;
determining CM points on a Hilbert moduli space corresponding to the ideal classes with polarizations;
evaluating the one or more invariant functions at the CM points to form desired polynomials of the one or more invariant functions;
reducing the desired polynomials modulo a prime and determining roots modulo the prime; and
applying the roots to Mestre's algorithm pulled back to the Hilbert moduli space to generate the genus 2 curve.

12. The method of claim 1, using the group for a cryptographic application comprising using the group for one or more of:
a digital signature;
encryption;
decryption;
public keys; or
private keys.

13. A system for generating a genus 2 curve for use in cryptography comprising:
a curve invariant determination component configured to determine one or more genus 2 curve invariant values by evaluating one or more invariant functions on a Hilbert modular surface;
a curve generation component configured to generate the a genus 2 curve using the one or more genus 2 curve invariant values; and
a group creation component configured to create a group from the genus 2 curve where the group is used for a cryptographic application, at least some of at least one of the curve invariant determination component, the curve generation component, or the group creation component implemented at least in part via a processing unit.

14. The system of claim 13, the curve invariant determination component configured to determine one or more genus 2 curve invariant values by evaluating one or more invariant functions on complex multiplication (CM) points on the Hilbert modular surface.

15. The system of claim 13, comprising a Mestre's algorithm adaptation component configured to adapt Mestre's algorithm for generating the genus 2 curve to an algorithm that uses the one or more genus 2 curve invariant values on the Hilbert modular surface to generate the genus 2 curve.

16. The system of claim 15, the Mestre's algorithm adaptation component configured to:
pull back Igusa invariants to invariants on a Hilbert moduli space; and
express the invariants polynomials on the Hilbert moduli space in terms of generators given by the one or more invariant functions on the Hilbert modular surface.

17. The system of claim 13, the group creation component comprising a Jacobian determination component configured to determine a Jacobian of the genus 2 curve to create the group.

18. The system of claim 13, the curve generation component comprising:
an input receiving component configured to receive input comprising a desired group order for the genus 2 curve and a group field for the genus 2 curve; and
a genus 2 curve equation generation component configured to generate an equation that describes the genus 2 curve over the group field with the desired group order.

19. The system of claim 18, the curve generation component comprising:
a CM field generation component operably coupled with the input receiving component and configured to calculate a complex multiplication (CM) field for the desired group order and the group field;
an ideal class generation component operably coupled with the CM field generation component and configured to determine one or more generators for ideal classes of the CM field;
a CM point determination component operably coupled with the ideal class generation component and configured to determine CM points on a Hilbert moduli space corresponding to the ideal classes with polarizations;
an invariant evaluation component operably coupled with the CM point determination component and configured to evaluate the one or more invariant functions at the CM points to form desired polynomials of the one or more invariant functions;
a roots generation component operably coupled with the invariant evaluation component and configured to reduce the desired polynomials modulo a prime and determine roots modulo the prime; and
a modified genus 2 curve generation component operably coupled with the roots generation component and configured to apply the roots to Mestre's algorithm pulled back to the Hilbert moduli space to generate the genus 2 curve.

20. A physical computer readable medium comprising computer executable instructions that when executed via a processing unit perform a method for generating a genus 2 curve for use in cryptography, the method comprising:
determining one or more invariant values for a genus 2 curve by evaluating one or more invariant functions on a Hilbert modular surface;
generating the genus 2 curve using the one or more invariant values; and
creating a group from the genus 2 curve where the group is used for a cryptographic application.

* * * * *